Patented May 14, 1929.

1,712,818

UNITED STATES PATENT OFFICE.

LENNART FORSÉN, OF GERKNAS, FINLAND.

HYDRAULIC-CEMENT COMPOSITION AND PROCESS OF PRODUCING SAME.

No Drawing. Application filed June 3, 1926, Serial No. 113,549, and in Finland October 24, 1924.

This process relates to cements having Portland cement as a substantial constituent and has for its object a product of improved quality as well as a process of producing same.

It is a matter of fact that in ordinary Portland cement of the present day strongly burned type, rich in silica a large proportion (more than 50%) of the cement is in such a coarsely ground condition, that it behaves as cement clinker and is not reacted upon by water.

The cement composition according to the present invention does not contain any substantial proportion of such nonreactive cement particles.

To render the production of a cement of this character commercially possible it is necessary to grind the coarser particles contained in ordinary cement products down to a very fine degree of subdivision.

An important feature of the invention consists in a method of grinding the cement to the required degree of fineness.

As is known the mills most frequently employed in Portland cement factories are ball- or roller mills, in which the grinding members consist of rolling balls or cylindrical bars of a size which varies according to the size of the cement grains. Thus in the first mill or in the first chamber of the mill large balls (diameter up to 120 mm.) are employed, while in the last section of the mill the balls are small (about 6 mm.). By controlling the quantity of material supplied, the degree of fineness of the resulting product can be regulated.

When the cement has to be ground to the particle size which is required in the product according to the present invention (without nonreactive cement particles) this method of grinding has been found to be too expensive.

According to the present invention satisfactory results can be obtained when the final grinding of the cement takes place in the presence of an added granular material of a greater hardness than the cement clinker particles themselves, but sufficiently soft to be at least in part disintegrated during the grinding operation.

As examples of materials, suitable as an addition may be mentioned quartz, granite macadam, quartz sand or coarse hard-grained sand. In the course of the grinding operation these added materials will be ground down to a smaller size of particles but will remain in a comparatively coarse-grained condition, while the cement having been from the start in the form of ordinary ground cement will have become converted into such a fine degree of subdivision as to react quantitatively with water. A Portland cement composition of this fine degree of subdivision will not show increased strength when tested after having been subjected to further grinding.

By treating the product according to blast separation methods the high grade cement can be separated from the coarse particles of added nonreactive material.

According to the invention it is possible to produce a high grade pure cement, but the invention also allows of a great number of different products to be produced.

The invention also comprises the production of a cement in which the coarse portion of the Portland cement (the clinker particles) is substituted for by a less expensive extender such as for example very finely subdivided sand, granite and the like. In the operation of grinding this extender however a portion thereof will unintentionally be ground to such a degree of fineness that it will behave as clay and diminish the strength of the concrete.

An important feature of the present invention now consists in a method of avoiding the weakening effect of the finest proportion of the extender. This method is based upon the fact that the finest portion of the extender is nearly of molecular degree of subdivision. This portion therefore will readily be converted into the form of colloidal solution in the presence of hydroxyl ions. If the fine particles consist of silica or an acid silicate they will react with lime to form hardening calcium silicates. By the addition of lime it is possible not only to eliminate the injurious influence of the very fine portion of the extender but also to utilize its power of forming hardening silicates through colloid reactions so as to effect increased strength.

The strength of Portland cement is also dependent upon the percentage of lime in the clinker. This percentage, however, can be increased only to a certain limit because the concrete will otherwise lose its volume constancy. According to the present invention it is possible to increase the percentage of lime considerably beyond this known limit and to increase considerably the strength of the cement when burnt lime is added to the cement after the burning operation. The burnt lime should preferably be so finely ground that it will become completely slaked before the binding of the cement takes place.

By this method the strength of the cement can be increased 10, 20 and 30 or more percent without involving elimination of the volume constancy.

A cement composition according to the present invention may be composed by mixing with each 100 parts by weight of Portland cement less than 20 parts by weight of lime, 5 parts of plaster of Paris and 125 parts by weight of extenders. These materials are preferably so finely ground that the Portland cement will react quantitatively with added water, that the silica in the extender will react with the lime and that the lime is completely slaked before the binding of the cement takes place.

A satisfactory product has been obtained by mixing and finely grinding 50 parts by weight of sand, 40 parts Portland cement, 2 parts of gypsum and 8 parts of burnt lime.

I claim:

1. Process of producing hydraulic cement compositions which comprises the steps of adding a granular extender as well as burnt lime to ordinary Portland cement, subjecting the mixture of materials to grinding, and continuing this grinding for a sufficiently long period of time to convert the Portland cement constituent into a product of sufficiently fine degree of subdivision to be able to react quantitatively with water.

2. Process of producing hydraulic cement compositions, which comprises the steps of adding a granular siliceous extender as well as burnt lime to ordinary Portland cement, subjecting the mixture of material to grinding, and continuing this grinding for a sufficiently long period of time to convert the Portland cement constituent into a product of sufficiently fine degree of subdivision to be able to react quantitatively with water, and separating the finer portions of the ground material from the remaining coarser particles of added granular extender by blast separation methods.

3. Process of producing hydraulic cement compositions, which comprises the steps of adding a granular siliceous extender as well as burnt lime to Portland cement of the commercial size of grain, subjecting the mixture of materials to grinding, and continuing this grinding until the Portland cement constituent is able to react quantitatively with water while a substantial portion of the added siliceous extender has been ground to a fine powder of substantially colloidal size of grain.

4. Process according to claim 1 in which the grinding is effected in a mill with rolling grinding members.

5. Portland cement compositions containing Portland cement of sufficiently fine degree of subdivision to be able to react quantitatively with water together with added burnt lime and a siliceous extender in sufficiently fine degree of subdivision to be able to react with lime in the presence of water.

In testimony whereof I have signed my name to this specification.

LENNART FORSÉN.